(12) United States Patent
Matsumura

(10) Patent No.: US 10,084,209 B2
(45) Date of Patent: Sep. 25, 2018

(54) VALVE REGULATED LEAD-ACID BATTERY

(71) Applicant: GS Yuasa International Ltd., Kyoto-shi, Kyoto (JP)

(72) Inventor: Tomoko Matsumura, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 87 days.

(21) Appl. No.: 15/028,904

(22) PCT Filed: Oct. 3, 2014

(86) PCT No.: PCT/JP2014/005048
§ 371 (c)(1),
(2) Date: Apr. 12, 2016

(87) PCT Pub. No.: WO2015/056417
PCT Pub. Date: Apr. 23, 2015

(65) Prior Publication Data
US 2016/0254570 A1    Sep. 1, 2016

(30) Foreign Application Priority Data
Oct. 15, 2013   (JP) .................................. 2013-214836

(51) Int. Cl.
H01M 10/10         (2006.01)
H01M 10/12         (2006.01)
(Continued)

(52) U.S. Cl.
CPC ........... H01M 10/121 (2013.01); C22C 11/06 (2013.01); H01M 4/685 (2013.01); H01M 4/73 (2013.01);
(Continued)

(58) Field of Classification Search
CPC ........ H01M 4/73; H01M 4/685; H01M 10/06; H01M 10/121; H01M 2220/10; H01M 10/10
See application file for complete search history.

(56) References Cited

U.S. PATENT DOCUMENTS

2004/0112486 A1 * 6/2004 Aust ....................... C22C 11/00
                                                          148/706
2006/0046148 A1    3/2006 Hirasawa
(Continued)

FOREIGN PATENT DOCUMENTS

EP       0252189       1/1988
JP       405343070 A * 12/1993 ............ H01M 4/68
(Continued)

OTHER PUBLICATIONS

Extended European Search Report dated May 24, 2017 issued in the corresponding European patent application No. 14854597.3.
International Search Report dated Dec. 9, 2014 filed in PCT/JP2014/005048.

*Primary Examiner* — Cynthia H Kelly
*Assistant Examiner* — Monique M Wills
(74) *Attorney, Agent, or Firm* — Rankin, Hill & Clark LLP

(57) ABSTRACT

A valve regulated lead-acid battery includes a positive electrode current collector which is a punched current collector obtained by punching a rolled sheet of lead alloy and in which the average interlayer distance in a layered current collector structure at a cross-section parallel to the rolling direction and along the thickness direction of the current collector is not less than 25 µm and not more than 180 µm.

12 Claims, 3 Drawing Sheets

(51) Int. Cl.
*C22C 11/06* (2006.01)
*H01M 4/73* (2006.01)
*H01M 4/68* (2006.01)
*H01M 10/06* (2006.01)

(52) U.S. Cl.
CPC ............ *H01M 10/06* (2013.01); *H01M 10/10* (2013.01); *H01M 2220/10* (2013.01)

(56) References Cited

U.S. PATENT DOCUMENTS

| | | |
|---|---|---|
| 2009/0081540 A1 | 3/2009 | Hirasawa |
| 2010/0101078 A1 | 4/2010 | Andersen |
| 2011/0262813 A1* | 10/2011 | Jung .................. C25D 5/56 429/245 |
| 2012/0064402 A1* | 3/2012 | Tsuji .................. H01M 2/266 429/211 |

FOREIGN PATENT DOCUMENTS

| | | |
|---|---|---|
| JP | 11054115 A2 | 2/1999 |
| JP | 2000348758 A2 | 12/2000 |
| JP | 2006066173 A2 | 3/2006 |
| JP | 2006294296 A2 | 10/2006 |
| JP | 2008084676 A1 | 4/2008 |
| JP | 2010520607 | 6/2010 |
| WO | 2009113166 A1 | 9/2009 |

\* cited by examiner

Fig. 6 shows a relationship between a rolling direction and a current collector.

(a) The vertical direction of the current collector is perpendicular to the rolling direction (b) The vertical direction of the current collector is parallel to the rolling direction

VALVE REGULATED LEAD-ACID BATTERY

TECHNICAL FIELD

The present invention relates to a valve regulated lead-acid battery, and particularly relates to a positive electrode grid thereof.

BACKGROUND ART

For a positive electrode current collector of a stationary valve regulated lead-acid battery (hereinafter, sometimes referred to as "VRLA battery") to be used in an emergency power supply unit (UPS) in a hospital, a factory or the like, generally a cast grid is used, and an expanded grid is not used. Usually, a stationary VRLA battery is float-charged and kept in a state of full charge at all times, and therefore generally, corrosion of a grid in a positive electrode dictates a life mode. For imparting corrosion resistance, a crosspiece of a positive electrode grid is required to have a certain thickness, but in the case of an expanded grid, it is difficult to prepare a thick grid, and thus the expanded grid is not suitable for a large stationary VRLA battery. When an expanded grid is used as a positive electrode grid of a VRLA battery, a positive electrode corrosion current during charge is large, so that a float current is not used for generation of oxygen, and therefore the oxygen absorption cycle in a negative electrode plate becomes incomplete. When the oxygen absorption cycle becomes incomplete, the negative electrode is polarized, and as a result, the float current decreases, so that the positive electrode comes into a poor charged state, leading to a reduction in discharge capacity. When an expanded grid is used in a positive electrode of a VRLA battery that is float-charged, the float current decreases, so that the battery comes into a poor charged state, leading to a reduction in life. For this reason, cast grids have been used in valve regulated lead-acid batteries.

Related prior arts will be shown. Patent Document 1 (JP-A-2006-294296) discloses that rolling is performed at a low rolling reduction ratio in an initial stage of rolling to maintain the strength of the deep part of a rolled sheet. Patent Document 2 (JP-A-2008-84676) describes that for an expanded grid (positive electrode grid) in a lead-acid battery, grain boundary corrosion is suppressed when the average particle size along a rolling direction is 150 μm or less. Patent Document 3 (JP-A-2000-348758) discloses a VRLA battery including an expanded grid as a positive electrode grid.

PRIOR ART DOCUMENTS

Patent Documents

Patent Document 1: JP-A-2006-294296
Patent Document 2: JP-A-2008-84676
Patent Document 3: JP-A-2000-348758

SUMMARY OF THE INVENTION

Problems to be Solved by the Invention

The inventor has paid attention to the fact that when a casting current collector is used as a positive electrode current collector in a VRLA battery, grain boundary corrosion progresses, so that the strength of the positive electrode current collector markedly decreases at the last stage of life. A decrease in strength of the positive electrode current collector causes the problem that at the time of vibrations or a disaster such as an earthquake, a positive electrode grid is collapsed or disconnected, and thus necessary discharge performance cannot be obtained.

An object of the present invention is to provide a valve regulated lead-acid battery which has a long life and exhibits excellent earthquake-proof characteristics even at the last stage of life.

Means for Solving the Problems

The present invention provides a valve regulated lead-acid battery including: a positive electrode current collector and a positive active material; a negative electrode current collector and a negative active material; and a liquid holding body, wherein the positive electrode current collector is a punched current collector obtained by punching a rolled sheet of lead alloy, and the average interlayer distance of a layered current collector structure at a cross-section of the current collector in a thickness direction is not less than 25 μm and not more than 180 μm.

Preferably, provided is a valve regulated lead-acid battery including: a positive electrode current collector and a positive active material; a negative electrode current collector and a negative active material; and a liquid holding body, wherein the positive electrode current collector is a punched current collector obtained by punching a rolled sheet of lead alloy, and the average interlayer distance in a layered grid structure at a cross-section parallel to the rolling direction and along the thickness direction of the current collector is not less than 25 μm and not more than 180 μm.

As the positive electrode current collector obtained using a rolled sheet of lead alloy, an expanded grid and a punched current collector are known. In the punched current collector, corrosion of the positive electrode current collector by a float charge current etc. is slow, and the float life (life at the time of use in float charge) is improved as compared to the expanded grid. It can be confirmed from actual data that the punched current collector has a longer float life than that of the expanded current collector, and as shown in Comparative Examples 4, 5 and 6 and Examples 2, 5 and 6 in Table 3, the float life of the punched grid is longer by 60% or more although there is no difference in composition of the positive electrode current collector and average interlayer distance in a rolled structure (layered current collector structure formed by rolling) between the punched current collector and the expanded current collector. As a charge method, there is trickle charge besides float charge, but in both the methods, a valve regulated lead-acid battery is used in the same way. When the float life is long, the life in trickle charge is also long, and when earthquake-proof characteristics at the last stage of life are high in float charge, earthquake-proof characteristics at the last stage of life are also high in trickle charge.

The inventor has found that the float life and earthquake-proof characteristics at the last stage of life depend on the average interlayer distance in the rolled structure of the positive electrode current collector. Specifically, when the average interlayer distance is decreased, the float life is reduced, and the life is reduced particularly when the average interlayer distance is less than 25 μm. In a positive electrode grid having a small average interlayer distance, the mechanism of corrosion is mainly exfoliation corrosion, and the smaller the average interlayer distance, the more rapidly exfoliation corrosion progresses. The float life markedly varies depending on whether the average interlayer distance is not less than 25 μm or less than 25 μm.

What brings a bad influence to earthquake-proof characteristics at the last stage of life is grain boundary corrosion in the cast structure of the positive electrode current collector. The influence of grain boundary corrosion varies depending on whether the average interlayer distance is not more than 180 μm or more than 180 μm, and when the average interlayer distance is 180 μm or less, earthquake-proof characteristics at the last stage of life are improved. When a cast slab is rolled, a cast structure having a large number of crystal grains is changed into a layered structure. Here, when the average interlayer distance is 180 μm or less, there exist almost no crystal grain boundaries, and corrosion progresses in an exfoliating manner, so that grain boundary corrosion no longer occurs, and therefore there is no situation in which corrosion locally progresses to break the grid. When the average interlayer distance is 50 μm or more, the float life is further improved, and when the average interlayer distance is 150 μm or less, earthquake-proof characteristics at the last stage of life are further improved. Therefore, the average interlayer distance is especially preferably not less than 50 μm and not more than 150 μm.

It is known that the crystal grain size and the number of crystal grains determine the speed of grain boundary corrosion. It is also known that grain boundary corrosion does not occur in a layered rolled structure. In addition thereto, it has been found that the average interlayer distance influences the speed of exfoliation corrosion. Thus, in the case of a positive electrode current collector formed by rolling, it is the average interlayer distance that influences the float life and earthquake-proof characteristics at the last stage of life when the composition is fixed. The influence of the particle size along the rolling direction on these performances is small. As shown in FIG. 5, the average interlayer distance has a connection with a rolling reduction ratio, the preferred range of the rolling reduction ratio is not less than 60% and not more than 90%.

Preferably, the positive electrode current collector is composed of a Pb—Ca—Sn alloy, and where x is a Ca content and y is a Sn content in terms of mass %, the requirements of $0.03 \leq x \leq 0.09$ and $9.16x+0.525 \leq y \leq 2.0$ are satisfied. This composition range is shown within the frame of the slanted line in FIG. 2. Deviation to any side from this range leads to a reduction in float life. This can be confirmed from Examples 1 to 7 and Examples 25 to 28 (the average interlayer distance is 62 μm in all the examples) in Table 3. The positive electrode grid may contain an antioxidant and inevitable impurities in an amount of 0.04 mass % in total in addition to Pb, Ca and Sn.

As shown in FIGS. 1(a) and 1(b), the punched current collector has a frame on four sides of the grid, so that a charge-discharge current is made uniform over the whole grid, and thus capacity reduction due to a poor charged state hardly occurs.

The average interlayer distance can be measured by observing a cross-section of the positive electrode current collector with, for example, an ear part and a frame rib using a metallurgical microscope. The interlayer distance can be observed without depending on the rolling direction, but the interlayer distance is more easily measured when observed in the rolling direction. For example, the ear part of the positive electrode current collector is cut in the longitudinal direction and the lateral direction (both of which are vertical to the thickness direction), the cut section is observed with a metallurgical microscope, and a rolling direction is identified by taking advantage of the fact that the crystal particle size is larger in the rolling direction. Next, along the rolling direction, the cross-section is observed at three spots on the ear part of the positive electrode current collector, the cross-section is observed at three spots on the frame rib of the current collector, the ratio of the thickness of the current collector and the number of layers is determined as an interlayer distance, and the average value of the interlayer distances at six spots is defined as an average interlayer distance. If there is no frame rib of the grid along the rolling direction, the inner rib of the current collector along the rolling direction, etc. may be used in place thereof.

FIG. 4 is a view showing a method for determining an average interlayer distance, where the cross-section of a current collector having a thickness of 0.8 mm is observed to find that there are 13 layers as shown with red lines, and thus the average interlayer distance is 62 μm.

The rolling direction is a traveling direction when a slab that is a mass of lead alloy passes through a rolling apparatus such as a roll to be formed into a sheet.

In preparation of a current collector from a rolled sheet, a method in which the ear part of the current collector is punched out from the sheet in a direction shown in FIG. 6(b), or a method in which the ear part is punched out in a direction different from the above-mentioned direction is used, and the ear part may be punched out in any direction.

Current collectors include a grid-shaped current collector that is generally called a grid, a current collector that is punched circularly or elliptically, and a current collector with a grid radially provided from the ear part thereof, and the current collector may be simply called a grid even though it is not grid-shaped.

MODE FOR CARRYING OUT THE INVENTION

Optimum examples of the invention of the present application will be shown below. In implementation of the invention of the present application, examples may be appropriately changed in accordance with common knowledge of a person skilled in the art and disclosures of prior arts.

Hereinafter, the current collector will be simply referred to as a grid in examples.

EXAMPLES

Figure 1:
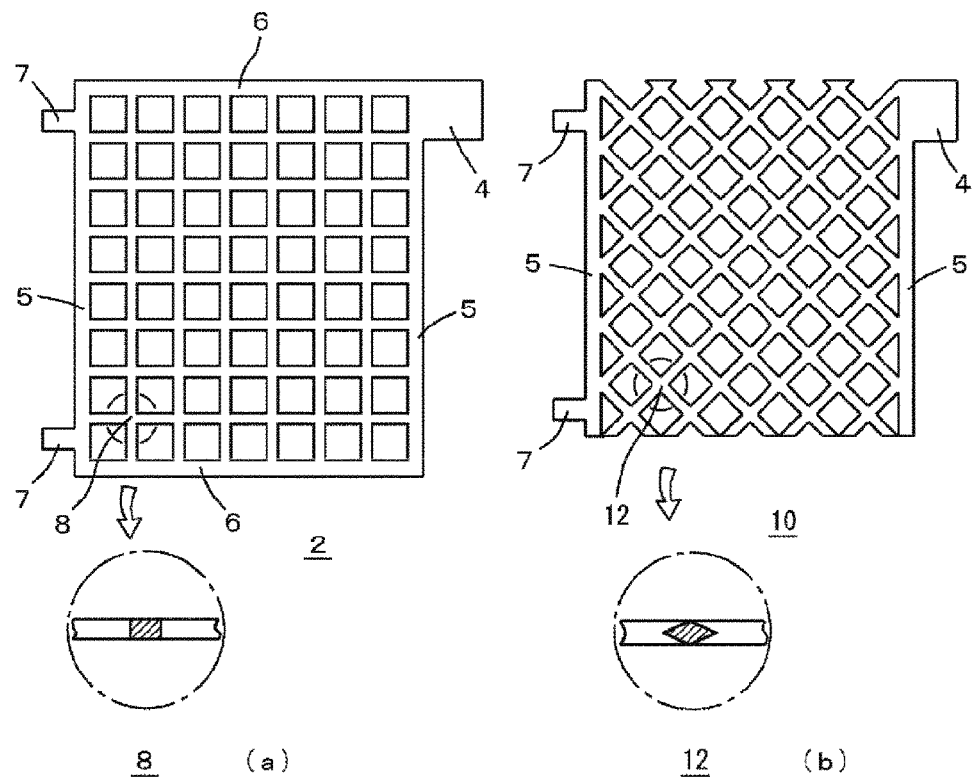
FIG. 1: a view schematically showing a punched grid (a) and an expanded grid (b).

Examples will be described with reference to FIGS. 1 to 3 and Tables 1 to 3. A punched grid 2 is shown in FIG. 1(a), and an expanded grid 10 is shown in FIG. 1(b) for comparison.

Reference numeral 4 denotes an ear, reference numerals 5 and 6 each denote a frame, and reference numeral 7 denotes a leg. The expanded grid 10 has no frame 6. The punched grid 2 has the frame 6, so that extension of the grid due to corrosion is suppressed, and the whole positive electrode plate is easily charged and discharged uniformly.

Figure 2:
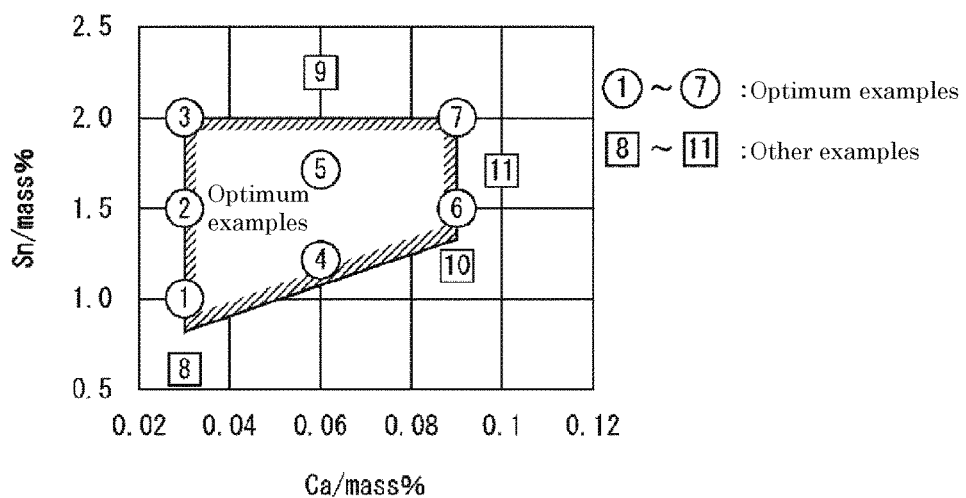
FIG. 2: a view showing the compositions of positive electrode grids in examples.
Figure 3:
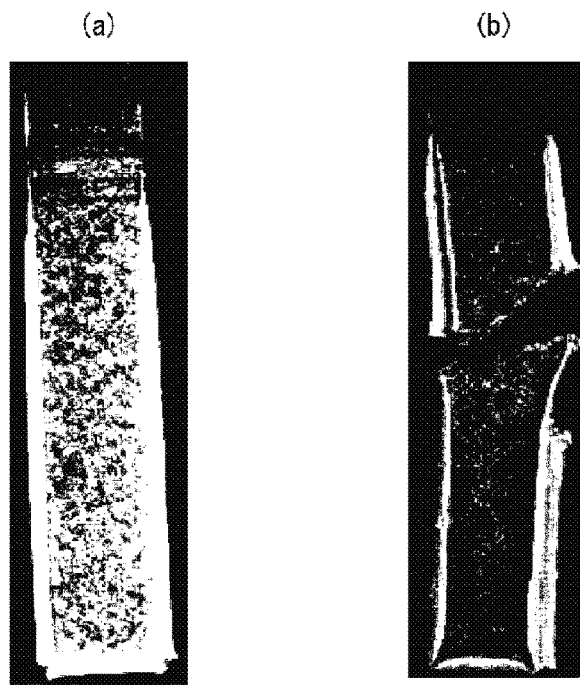
FIGS. 3(a) and 3(b) each show a photograph of a sample after a corrosion test, where both the samples in FIG. 3(a) and FIG. 3(b) have a composition 1, and the average interlayer distance in the grid structure is 125 μm in FIGS. 3(a) and 199 μm in FIG. 3(b).
Figure 4:
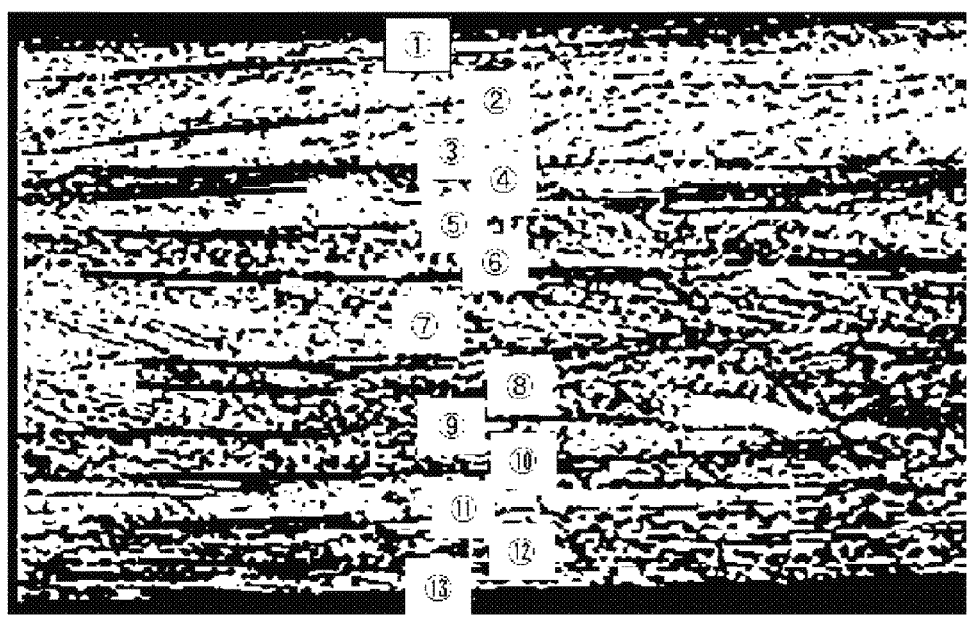
FIG. 4 is a view showing a method for determining an average interlayer distance.
Figure 5:
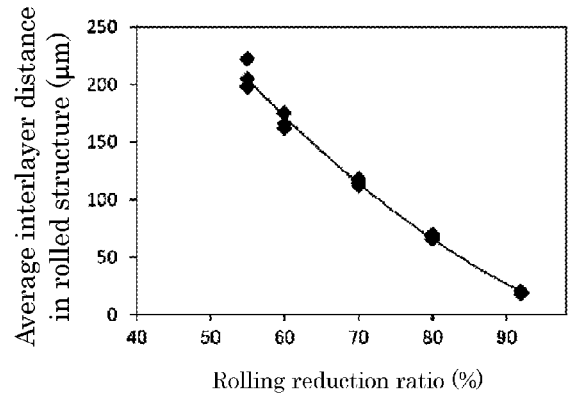
FIG. 5 is a view showing a relationship between a rolling reduction rate and an average interlayer distance.
Figure 6:
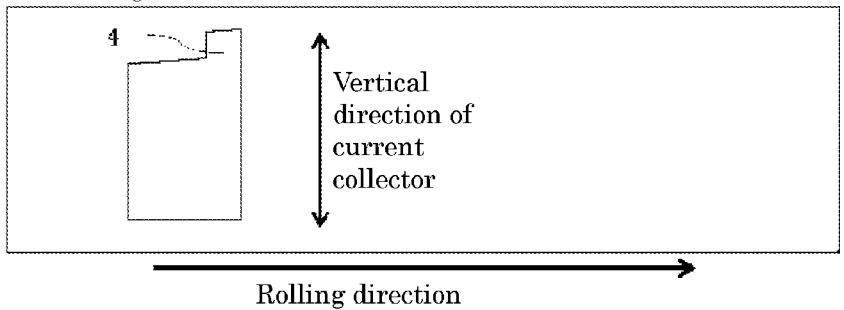
FIG. 6 shows a relationship between a rolling direction and a current collector.
Figure 6:
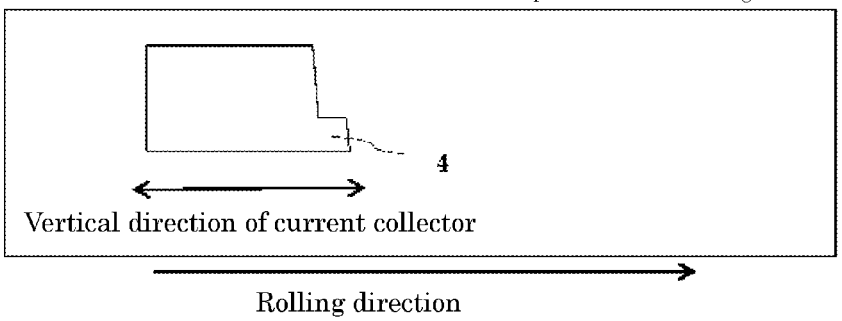

As positive electrode grid materials, Pb—Ca—Sn alloy sheets with compositions 1 to 11, respectively, were provided as shown in Table 1 and FIG. 2. The range of optimum examples corresponds to the inside of the slanted line in FIG. 2, and where x is a Ca content in terms of mass %, the requirement of $0.03 \leq x \leq 0.09$ is satisfied. Where y is a Sn content in terms of mass %, the requirement of $y \leq 2.0$ is satisfied, and the slanted boundary line extending from the lower left part to the upper right part in FIG. 2 meets the relationship of $9.16x+0.525=y$. Rolled sheets with average interlayer distances of 14 μm, 26 μm, 62 μm, 125 μm, 178 μm and 199 μm, respectively, were produced with the rolling reduction ratio changed in a cold process. Next, the rolled sheet was punched to prepare a positive electrode grid having a thickness of 3 mm. Besides, an expanded grid was produced from the rolled sheet with an average interlayer distance of 62 μm, and another positive electrode grid was produced by casting. For producing rolled sheets having the same average interlayer distance, the rolling reduction ratio was adjusted according to the grid composition, and the rolling reduction ratio was changed to achieve a required average interlayer distance. For typical positive electrode grids, the average interlayer distance in the rolled structure is shown in Table 2.

The rolling reduction ratio means how the thickness of a slab that is a mass of lead alloy is changed after it is formed into a sheet as compared to the thickness before rolling when the slab passes through a rolling apparatus such as a roll to be formed into the sheet. The rolling reduction ratio is given by the formula: (slab thickness−sheet thickness)/slab thickness×100 (%).

TABLE 1

| Composition | Ca (mass %) | Sn (mass %) |
|---|---|---|
| Composition 1 | 0.03 | 0.8 |
| Composition 2 | 0.03 | 1.5 |
| Composition 3 | 0.03 | 2 |
| Composition 4 | 0.06 | 1.2 |
| Composition 5 | 0.06 | 1.7 |
| Composition 6 | 0.09 | 1.5 |
| Composition 7 | 0.09 | 2 |
| Composition 8 | 0.03 | 0.6 |
| Composition 9 | 0.06 | 2.2 |
| Composition 10 | 0.09 | 1.2 |
| Composition 11 | 0.1 | 1.7 |

TABLE 2

| Samples | Average interlayer distance in rolled structure (μm) |
|---|---|
| Example 15 | 26 |
| Example 1 | 62 |
| Example 8 | 125 |
| Example 16 | 178 |

As an unformed positive active material, 99.9 mass % of a lead powder formed by a ball mill method, and 0.1 mass % of synthetic resin fibers were formed into a paste with sulfuric acid having a specific gravity of 1.16 at 25° C., the paste was filled into positive electrode grids, and dried and cured, and the positive electrode grids were connected together with a strap to prepare an element including four positive electrode plates. The composition, density and so on of the positive active material are arbitrary.

Negative electrode grids containing 0.1 mass % of Ca, 0.7 mass % of Sn and 0.02 mass % or less of Al, with the remainder including Pb and inevitable impurities, were produced by casting. The composition of the negative electrode grid, the type of grid such as a cast or punched grid, and parameters such as an average interlayer distance are arbitrary. As a negative active material, 98.3 mass % of a lead powder formed by a ball mill method, 0.1 mass % of synthetic resin fibers, 0.1 mass % of carbon black, 1.4 mass % of $BaSO_4$, and 0.1 mass % of lignin were formed into a paste with sulfuric acid having a specific gravity of 1.14 at 25° C., and the paste was filled into the negative electrode grids. The paste was dried and cured, and the negative electrode grids were connected together with a strap to prepare an element including five negative electrode plates.

A liquid holding body such as a retainer mat was disposed between the positive electrode plate and the negative electrode plate, they were stored in a container while a pressure was applied, sulfuric acid was added as an electrolyte solution, and container formation was performed to prepare a valve regulated lead-acid battery having a capacity of 60 A·h. Silica gel etc. may be used as the liquid holding body, and the configuration of the valve regulated lead-acid battery is arbitrary except for the positive electrode grid. For example, the negative electrode grid may be a cast, expanded or a punched negative electrode grid. The compositions of the positive active material and the negative active material are arbitrary.

A float life test accelerated at a high temperature was conducted in the assumption of a stationary VRLA battery. A charge voltage of 2.23 V was applied at 60° C. at all times, and a discharge capacity was determined every month from an amount of electricity until the terminal voltage decreased to 1.75 V at a discharge current of 0.2 CA at 25° C. The VRLA battery was considered to reach the end of float life at the time when the discharge capacity decreased to 80% or less of the initial value. A vibration with an acceleration of 1.2 G was applied in each of XYZ directions to the VRLA battery which reached the end of float life, and the vibration frequency was swept from 1 Hz to 30 Hz in 45 seconds. After the vibration was applied, the discharge capacity was measured again under the above-mentioned conditions. Values obtained by converting the high-temperature-accelerated float life to a life at normal temperature (25° C.), and capacity holding ratios after the vibration test with the initial capacity set to 100% are shown in Table 3.

TABLE 3

| Samples | Grid production method | Alloy composition | Average interlayer distance in rolled structure (μm) | High-temperature-accelerated float life years (25° C. equivalent) | Capacity holding ratio after vibration test at the last stage of life (initial capacity: 100) |
|---|---|---|---|---|---|
| Comparative Example 1 | Casting | Composition 2 | — | 15.2 | 45.3 |
| Comparative Example 2 | Casting | Composition 5 | — | 16.0 | 44.0 |
| Comparative Example 3 | Casting | Composition 6 | — | 14.7 | 46.1 |

TABLE 3-continued

| Samples | Grid production method | Alloy composition | Average interlayer distance in rolled structure (μm) | High-temperature-accelerated float life years (25° C. equivalent) | Capacity holding ratio after vibration test at the last stage of life (initial capacity: 100) |
|---|---|---|---|---|---|
| Comparative Example 4 | Expanding | Composition 2 | 62 | 8.4 | 78.7 |
| Comparative Example 5 | Expanding | Composition 5 | 62 | 9.2 | 78.4 |
| Comparative Example 6 | Expanding | Composition 6 | 62 | 7.9 | 79.0 |
| Example 1 | Punching | Composition 1 | 62 | 14.0 | 77.4 |
| Example 2 | Punching | Composition 2 | 62 | 14.8 | 76.0 |
| Example 3 | Punching | Composition 3 | 62 | 13.9 | 77.2 |
| Example 4 | Punching | Composition 4 | 62 | 14.5 | 76.1 |
| Example 5 | Punching | Composition 5 | 62 | 15.1 | 76.0 |
| Example 6 | Punching | Composition 6 | 62 | 14.2 | 77.2 |
| Example 7 | Punching | Composition 7 | 62 | 13.9 | 77.7 |
| Example 25 | Punching | Composition 8 | 62 | 11.2 | 78.9 |
| Example 26 | Punching | Composition 9 | 62 | 12.6 | 77.8 |
| Example 27 | Punching | Composition 10 | 62 | 10.8 | 79.5 |
| Example 28 | Punching | Composition 11 | 62 | 12.4 | 78.2 |
| Example 8 | Punching | Composition 1 | 125 | 13.8 | 76.2 |
| Example 9 | Punching | Composition 2 | 125 | 14.5 | 75.7 |
| Example 10 | Punching | Composition 3 | 125 | 14.1 | 76.5 |
| Example 11 | Punching | Composition 4 | 125 | 14.3 | 75.6 |
| Example 12 | Punching | Composition 5 | 125 | 14.8 | 75.3 |
| Example 13 | Punching | Composition 6 | 125 | 13.8 | 75.8 |
| Example 14 | Punching | Composition 7 | 125 | 13.6 | 76.7 |
| Example 29 | Punching | Composition 8 | 125 | 10.8 | 78.4 |
| Example 30 | Punching | Composition 9 | 125 | 12.2 | 77.1 |
| Example 31 | Punching | Composition 10 | 125 | 10.1 | 78.4 |
| Example 32 | Punching | Composition 11 | 125 | 11.9 | 77.6 |
| Comparative Example 7 | Punching | Composition 1 | 14 | 11.6 | 79.2 |
| Example 15 | Punching | Composition 1 | 26 | 13.2 | 78.0 |
| Example 1 | Punching | Composition 1 | 62 | 14.0 | 77.4 |
| Example 8 | Punching | Composition 1 | 125 | 13.8 | 76.2 |
| Example 16 | Punching | Composition 1 | 178 | 13.9 | 75.3 |
| Comparative Example 8 | Punching | Composition 1 | 199 | 14.2 | 64.6 |
| Comparative Example 9 | Punching | Composition 1 | 14 | 12.5 | 78.2 |
| Example 17 | Punching | Composition 2 | 26 | 13.9 | 77.4 |
| Example 2 | Punching | Composition 2 | 62 | 14.8 | 76.0 |
| Example 9 | Punching | Composition 2 | 125 | 14.5 | 75.7 |
| Example 18 | Punching | Composition 2 | 178 | 14.6 | 75.1 |
| Comparative Example 10 | Punching | Composition 2 | 199 | 14.6 | 61.9 |
| Comparative Example 11 | Punching | Composition 4 | 14 | 12.2 | 78.3 |
| Example 19 | Punching | Composition 4 | 26 | 13.7 | 77.9 |
| Example 4 | Punching | Composition 4 | 62 | 14.5 | 76.1 |
| Example 11 | Punching | Composition 4 | 125 | 14.3 | 75.6 |
| Example 20 | Punching | Composition 4 | 178 | 14.5 | 75.1 |
| Comparative Example 12 | Punching | Composition 4 | 199 | 14.7 | 61.7 |
| Comparative Example 13 | Punching | Composition 6 | 14 | 10.8 | 79.6 |
| Example 21 | Punching | Composition 6 | 26 | 13.2 | 78.1 |
| Example 6 | Punching | Composition 6 | 62 | 14.2 | 77.2 |
| Example 13 | Punching | Composition 6 | 125 | 13.8 | 75.8 |
| Example 22 | Punching | Composition 6 | 178 | 14.1 | 75.3 |
| Comparative Example 14 | Punching | Composition 6 | 199 | 14.3 | 64.1 |
| Comparative Example 15 | Punching | Composition 7 | 14 | 11.9 | 79.2 |
| Example 23 | Punching | Composition 7 | 26 | 13.4 | 78.5 |
| Example 7 | Punching | Composition 7 | 62 | 13.9 | 77.7 |
| Example 14 | Punching | Composition 7 | 125 | 13.6 | 76.7 |
| Example 24 | Punching | Composition 7 | 178 | 13.7 | 75.4 |
| Comparative Example 16 | Punching | Composition 7 | 199 | 14.0 | 67.3 |

Preferably, the life is 13 years or more, and the capacity holding ratio is 75% or more.

For the cast grids (Comparative Examples 1 to 3), the float life was long, but the capacity holding ratio at the last stage of life was low, and this was due to collapse of the grid by grain boundary corrosion, and falling-off of the positive active material. For the expanded grids (Comparative Examples 4 to 6), the float life was extremely short, and particularly, the float life was markedly shorter as compared to the punched grids (Examples 2, 5 and 6) with the same grid composition and the same average interlayer distance. This indicates that since the corrosion current increased because a rolled sheet was used in the grid, and further, the current distribution became uneven because a grid frame was absent, the battery came into a poor charged state, so that the discharge capacity early decreased.

On the other hand, when a punched grid was used, and the average interlayer distance was 26 μm to 178 μm, long float life performance was achieved, and a capacity holding ratio (ratio of capacities at the last stage of life and at the initial stage) of 75% or more was obtained even at the last stage of life. When the average interlayer distance was 14 μm, the float life decreased to less than 13 years, and when the average interlayer distance was more than 180 μm, the capacity holding ratio decreased to less than 75%.

It was found that for the compositions 8 to 11 falling out of the optimum range (Examples 25 to 32), the float life was short. When the Ca concentration was less than 0.03 mass %, the strength of the grid was low from the initial stage, and when the Ca concentration was more than 0.09 mass %, corrosion easily progressed, and caused the grid to easily extend, so that a short circuit easily occurred. It was also found that when the Sn concentration fell out of the optimum range, corrosion easily progressed. The VRLA batteries of Examples 25 to 32 are included in the present invention in that the average interlayer distance is optimized to secure both float life performance and earthquake-proof characteristics at the last stage of life.

For examining the relationship between the average interlayer distance in the positive electrode grid and corrosion, a rolled plate before punching was immersed in a sulfuric acid electrolyte solution having a specific gravity of 1.28, a corrosion test at a constant potential of 1.8 V as calculated in terms of a standard hydrogen electrode at 75° C. was conducted for 4 months, and the corrosion state was observed. A pure Pb electrode was used as a counter electrode, and an Ag/AgCl/KCl electrode was used as a reference electrode. The state of the sample after the corrosion test is shown for the rolled plate in Example 8 (FIG. 3(a)) and the rolled plate in Comparative Example 8 (FIG. 3(b)). In Comparative Example 8 where the average interlayer distance was 199 μm, the rolled plate was broken by grain boundary corrosion.

In examples, a punched grid is used, and the average interlayer distance is 25 μm or more, so that exfoliation corrosion is suppressed, and the average interlayer distance is 180 μm or less, so that grain boundary corrosion is suppressed. Accordingly, a VRLA battery excellent in float life and earthquake-proof characteristics at the last stage of life is obtained.

In examples, a stationary VRLA battery has been described, but a charge method other than float charge may be used, and the VRLA battery may be used in applications other than stationary applications.

DESCRIPTION OF REFERENCE SIGNS

2 Punched grid
4 Ear part
5,6 Frame
7 Leg
8,12 Crosspiece
10 Expanded grid

The invention claimed is:

1. A valve regulated lead-acid battery comprising: a positive electrode current collector and a positive active material; a negative electrode current collector and a negative active material; and a liquid holding body, wherein the positive electrode current collector is a punched current collector obtained by punching a rolled sheet of lead alloy, the average interlayer distance of a layered current collector structure at a cross-section of the current collector in a thickness direction is not less than 25 μm and not more than 180 μm, the positive electrode current collector is composed of a Pb—Ca—Sn alloy, and where x is a Ca content and y is a Sn content in terms of mass %, the requirements of $0.03 \leq x \leq 0.09$ and $9.16x+0.525 \leq y \leq 2.0$ are satisfied.

2. A valve regulated lead-acid battery comprising: a positive electrode current collector and a positive active material; a negative electrode current collector and a negative active material; and a liquid holding body, wherein the positive electrode current collector is a punched current collector obtained by punching a rolled sheet of lead alloy, the average interlayer distance in a layered current collector structure at a cross-section parallel to the rolling direction and along the thickness direction of the current collector is not less than 25 μm and not more than 180 μm, the positive electrode current collector is composed of a Pb—Ca—Sn alloy, and where x is a Ca content and y is a Sn content in terms of mass %, the requirements of $0.03 \leq x \leq 0.09$ and $9.16x+0.525 \leq y \leq 2.0$ are satisfied.

3. The valve regulated lead-acid battery according to claim 1, wherein the positive electrode current collector includes a frame on four sides.

4. The valve regulated lead-acid battery according to claim 1, wherein the average interlayer distance in the layered current collector structure is not less than 50 μm and not more than 180 μm.

5. The valve regulated lead-acid battery according to claim 1, wherein the average interlayer distance in the layered current collector structure is not less than 25 μm and not more than 150 μm.

6. The valve regulated lead-acid battery according to claim 1, wherein the average interlayer distance in the layered current collector structure is not less than 50 μm and not more than 150 μm.

7. A method for producing a valve regulated lead-acid battery comprising providing a positive electrode current collector and a positive active material, a negative electrode current collector and a negative active material, and a liquid holding body in a container,
wherein the positive electrode current collector is a punched current collector obtained by punching a rolled sheet of lead alloy and in which the average interlayer distance in a layered current collector structure at a cross-section parallel to the rolling direction and along the thickness direction of the current collector is not less than 25 μm and not more than 180 μm, the positive electrode current collector is composed of a Pb—Ca—Sn alloy, and where x is a Ca content and y is a Sn content in terms of mass %, the requirements of $0.03 \leq x \leq 0.09$ and $9.16x+0.525 \leq y \leq 2.0$ are satisfied.

8. A method for producing a valve regulated lead-acid battery comprising providing a positive electrode current collector and a positive active material, a negative electrode current collector and a negative active material, and a liquid holding body in a container,
wherein the positive electrode current collector is a punched current collector obtained by punching a rolled sheet of lead alloy prepared in such a manner that the rolling reduction ratio is 60 to 90% and in which the average interlayer distance in a layered current collector structure at a cross-section parallel to the rolling direction and along the thickness direction of the current collector is not less than 25 μm and not more than 180 μm, the positive electrode current collector is composed of a Pb—Ca—Sn alloy, and where x is a Ca content and y is a Sn content in terms of mass %, the requirements of $0.03 \leq x \leq 0.09$ and $9.16x+0.525 \leq y \leq 2.0$ are satisfied.

9. The valve regulated lead-acid battery according to claim 2, wherein the positive electrode current collector includes a crosspiece having a rectangular cross-section, and has a frame on four sides.

10. The valve regulated lead-acid battery according to claim 2, wherein the average interlayer distance in the layered current collector structure is not less than 50 μm and not more than 180 μm.

11. The valve regulated lead-acid battery according to claim 2, wherein the average interlayer distance in the layered current collector structure is not less than 25 μm and not more than 150 μm.

12. The valve regulated lead-acid battery according to claim 2, wherein the average interlayer distance in the layered current collector structure is not less than 50 μm and not more than 150 μm.

\* \* \* \* \*